US012769695B2

(12) United States Patent
Pierco et al.

(10) Patent No.: US 12,769,695 B2
(45) Date of Patent: Oct. 20, 2026

(54) COMBINATIONAL LOGIC-BASED SERIALIZER

(71) Applicant: NVIDIA Corporation, Santa Clara, CA (US)

(72) Inventors: Ramses Pierco, Ghent (BE); Timothy De Keulenaer, Ghent (BE)

(73) Assignee: NVIDIA Corporation, Santa Clara, CA (US)

( * ) Notice: Subject to any disclaimer, the term of this patent is extended or adjusted under 35 U.S.C. 154(b) by 352 days.

(21) Appl. No.: 18/485,827

(22) Filed: Oct. 12, 2023

(65) Prior Publication Data

US 2025/0123992 A1 Apr. 17, 2025

(51) Int. Cl.
*G06F 13/42* (2006.01)
*G06F 1/04* (2006.01)

(52) U.S. Cl.
CPC ............ *G06F 13/4282* (2013.01); *G06F 1/04* (2013.01); *G06F 2213/0002* (2013.01)

(58) Field of Classification Search
None
See application file for complete search history.

(56) References Cited

U.S. PATENT DOCUMENTS 6,016,463 A * 1/2000 Ng .................. G11B 20/10009 702/69
11,165,533 B1 * 11/2021 Sedarat .................. H04L 25/03
2002/0015247 A1 * 2/2002 Rosky .............. G11B 20/10009 360/68
2005/0068209 A1 * 3/2005 Kim ...................... H03M 13/00 341/68
2008/0056382 A1 * 3/2008 Hudson ................ H04N 21/643 375/240.26
2009/0128378 A1 * 5/2009 Cideciyan ............ H03M 5/145 341/59
2010/0295600 A1 * 11/2010 Kim ............... G01R 31/318513 327/365
2013/0089327 A1 * 4/2013 Zhang ................ H04B 10/5561 398/45

OTHER PUBLICATIONS www.wikipedia.org, Integrated Circuit (Year: 2004).*
www.wikipedia.org, XNOR gate (Year: 2021).*

* cited by examiner

*Primary Examiner* — Henry Tsai
*Assistant Examiner* — Dean Phan
(74) *Attorney, Agent, or Firm* — Lowenstein Sandler LLP

(57) ABSTRACT

An integrated circuit includes logic circuitry configured to output serialized data from a plurality of precoded data inputs without use of a clock signal. The integrated circuit further includes a precoder circuit responsive to the clock signal to generate the plurality of precoded data inputs based on timing of data symbols positioned within a plurality of data inputs.

19 Claims, 9 Drawing Sheets

COMBINATIONAL LOGIC-BASED SERIALIZER

TECHNICAL FIELD

At least one embodiment generally pertains to integrated circuits (ICs), and more specifically, but not exclusively, to low activity, a combinational logic-based serializer.

BACKGROUND

In certain serializers integrated within communication systems, including high-speed serializer-deserializer (SERDES) systems, input data is retimed and multiplexed from a plurality of data inputs to a single, serial data output. The serialized data output may then be transmitted to an opposing link device, for example, or other devices. In these serializers, a clock signal is used to ensure proper generation and distribution of the data from the plurality of inputs to the single, serial data output. Further, in these serializers, the biggest contributor to overall serializer power is the power consumed by the last multiplexer stage (e.g., a high-rate M:1 multiplexer) and full-rate clock distribution.

BRIEF DESCRIPTION OF DRAWINGS

Various embodiments in accordance with the present disclosure will be described with reference to the drawings, in which.

DETAILED DESCRIPTION

Figure 1:
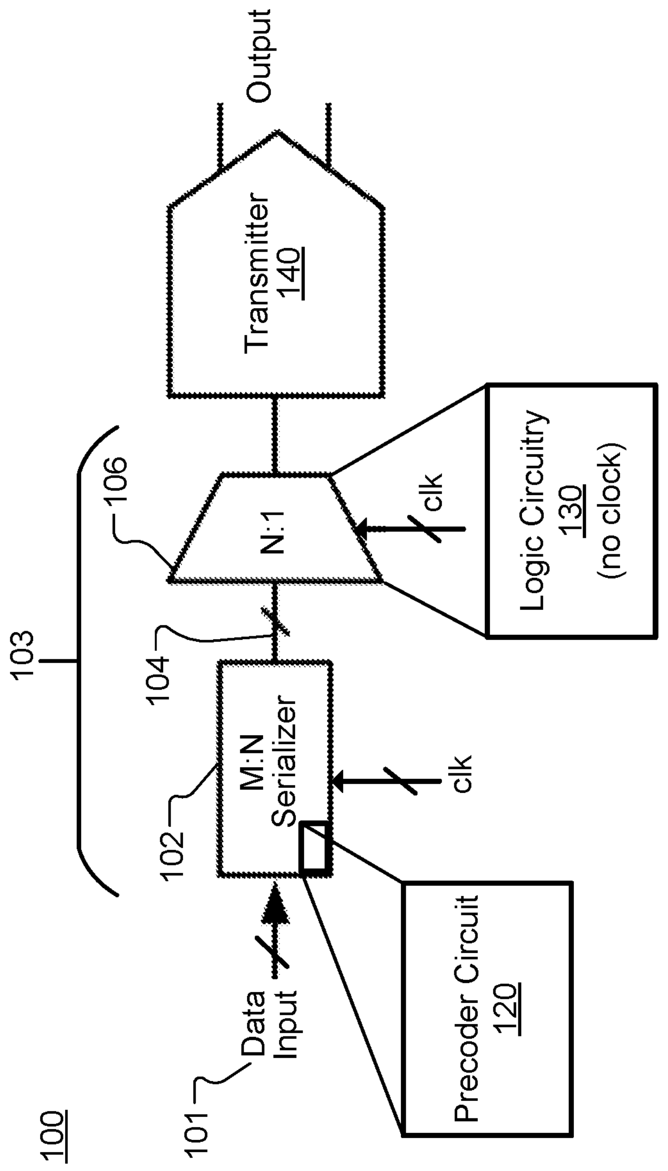
FIG. 1 is a schematic block diagram of an exemplary data serializer system according to various embodiments.

As described above, the biggest contributor to overall serializer power is the power consumed by the last multiplexer stage (e.g., a high-rate M:1 multiplexer) and full-rate clock distribution. Aspects and embodiments of the present disclosure address the above deficiencies by replacing one or more clocked multiplexer stages with combinational logic operations that obviate the need for full-rate clocking of at least one multiplexer stage. In some embodiments, the replacement includes replacing a final multiplexer stage with combinational logic.

In various embodiments, using such combinational logic, clocked multiplexer stages are completely or partially omitted by precoding the parallelized data received. For example, if logic circuitry of an exclusive or (XOR) is employed within a final multiplexer stage without a clock signal, a precoder circuit may be employed before the logic circuitry in the serialization chain of components to format the parallelized data in a way that the XOR functionality can generate the serialized data output from the precoded data.

In at least one embodiment, a serializer (e.g., an integrated circuit) includes logic circuitry configured to output serialized data from multiple precoded data inputs without using a clock signal. In some embodiments, the serializer also includes a precoder circuit, responsive to the clock signal, that generates multiple precoded data inputs based on the timing of data symbols positioned within multiple data inputs to the serializer. The precoder circuit, for example, may cause timing of transitional changes in the data symbols within the multiple data inputs to also appear in the multiple precoded data inputs that exit the precoder circuit. These transitional changes, however, may be formatted in the multiple precoded data inputs in a way that enables the logic circuitry to, without the clock signal, generate the serialized data that would have been expected from operations of a clock-driven M:1 multiplexer. Here, M can be the number of the multiple data inputs to the serializer or the precoder circuit.

In some embodiments, the serializer also includes a retimer circuit to generate multiple retimed data inputs based on a clock signal. In these embodiments, the precoder circuit generates, from the multiple retimer data inputs, multiple precoded data inputs based on timing of data symbols positioned within the multiple retimer data inputs. The serializer also includes logic circuitry configured to output serialized data from the multiple precoded data inputs without using the clock signal.

Therefore, advantages of the IC chips, dice, systems, and methods implemented in accordance with some embodiments of the present disclosure include, but are not limited to, a significant reduction in power consumption by a serializer method, device, or system. The decrease in power consumption, and concomitant cost savings, may be achieved without a loss of speed or accuracy of serialized data outputs. Other advantages will be apparent to those skilled in the art of serializers and SERDES devices, as will be discussed hereinafter.

FIG. 1 is a schematic block diagram of an exemplary data serializer system 100 according to various embodiments. In some embodiments, the data serializer system 100 (and any other serializer disclosed herein) is implemented by an integrated circuit or device that employs a serializer. In some embodiments, the system 100 includes a first set of input lines 101, a combinational serializer 103 to receive the first set of input lines 101, and a transmitter 140 coupled to an output of the combinational serializer 103 to generate an output of the data serializer system 100. In some embodiments, the output of the combinational serializer 103 is differential, e.g., data bits are output through an inverted line and a non-inverted line, which increases an amplitude of the received signal. In some embodiments, the output of the combinational serializer 103 is not differential.

In at least some embodiments, the combinational serializer 103 includes a serializer 102, a second set of input lines 104 that are fewer in number than the first set of input lines 101, and a multiplexer circuit 106 coupled to the serializer 102 via the second set of input lines 104. In some embodiments, the serializer 102 is an M:N serializer that is timed off a clock signal (clk). In these embodiments, M is the number of the first set of input lines 101, and N is the number of the second set of input lines 104. Thus, in some embodiments, the serializer 102 serializes input data (e.g., parallel data) from the first set of input lines 101 to the second set of input lines 104. In some embodiments, the multiplexer 106 is an N:1 multiplexer where N is the number of the second set of input lines 104, and the multiplexer 106 is clocked, e.g., by the same clock signal (clk) as the serializer 102.

Further, in various embodiments, the multiplexer 106 is replaced with logic circuitry 130 configured to output serialized data from multiple precoded data inputs without use of the clock signal. In these embodiments, the serializer 102 receives the clock signal (clk) and includes a precoder circuit 120 configured to, responsive to the clock signal, generate the multiple precoded data inputs based on timing of data symbols positioned within multiple data inputs. For example, in some embodiments, the precoder circuit 120 causes timing of transitional changes in the data symbols within multiple data inputs (e.g., from the first set of input lines 101) to also appear in the multiple precoded data inputs in a way that enables the logic circuitry 130 to generate the serialized data that would have been expected from operations of the N:1 multiplexer, where N is the number of data inputs, e.g., from the second set of input lines 104.

Figure 2A:
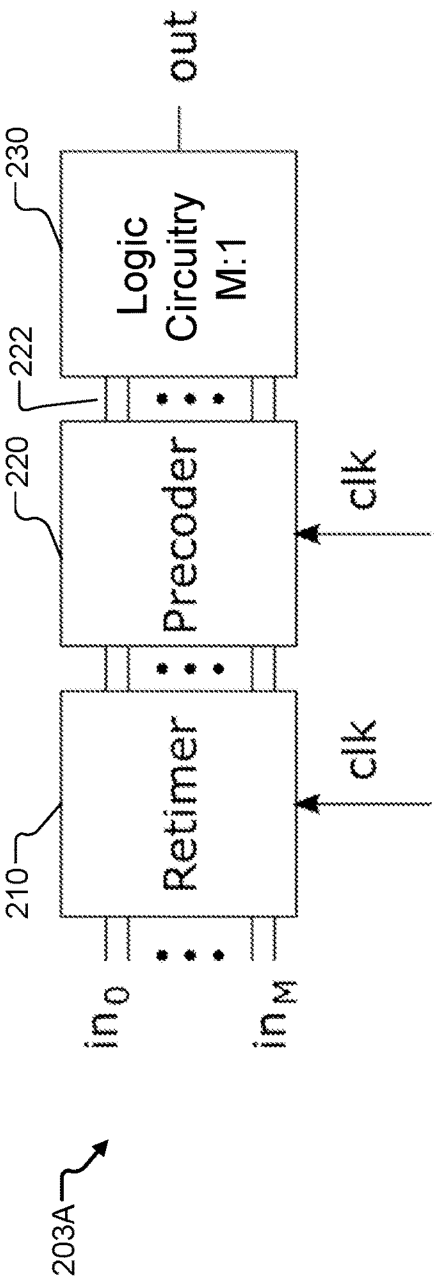
FIG. 2A is a schematic block diagram illustrating a combinational serializer according to at least one embodiment.

FIG. 2A is a schematic block diagram illustrating a combinational serializer 203A according to at least one embodiment. In some embodiments, the combinational serializer 203A includes a retimer circuit 210 that receives multiple data inputs ($in_0 \ldots in_M$), a precoder 220 coupled to the retimer circuit 210, and logic circuitry 230 coupled to the precoder circuit 220. In these embodiments, the retimer circuit 210 is coupled between an input (e.g., the multiple data inputs) and the precoder circuit 220, where the retimer circuit 210 generates multiple data inputs that are retimed based on the clock signal (clk). In various embodiments, the precoder circuit 220 is configured to generate multiple precoded data inputs 222 based on the multiple data inputs and the clock signal.

In various embodiments, the logic circuitry 230 is an exclusive OR (XOR) gate with a number of inputs matching a number of the multiple precoded data inputs 222. In other embodiments, the logic circuitry 230 is a not-exclusive OR (XNOR) gate with a number of inputs matching a number of the multiple precoded data inputs 222. Other logic circuitry capable of changing an output for a change in each single precoded input is also envisioned. In various embodiments, the precoder circuit 220 includes including XOR, XNOR, and/or other summing logic implemented with a modulo 2 function to the inputs or outputs. Thus, as is illustrated according to these embodiments, the precoder circuit 220 and the logic circuitry 230 may replace all multiplexer stages, e.g., the M:N serializer 102 and the multiplexer 106 of the data serializer system 100 of FIG. 1.

Figure 2B:
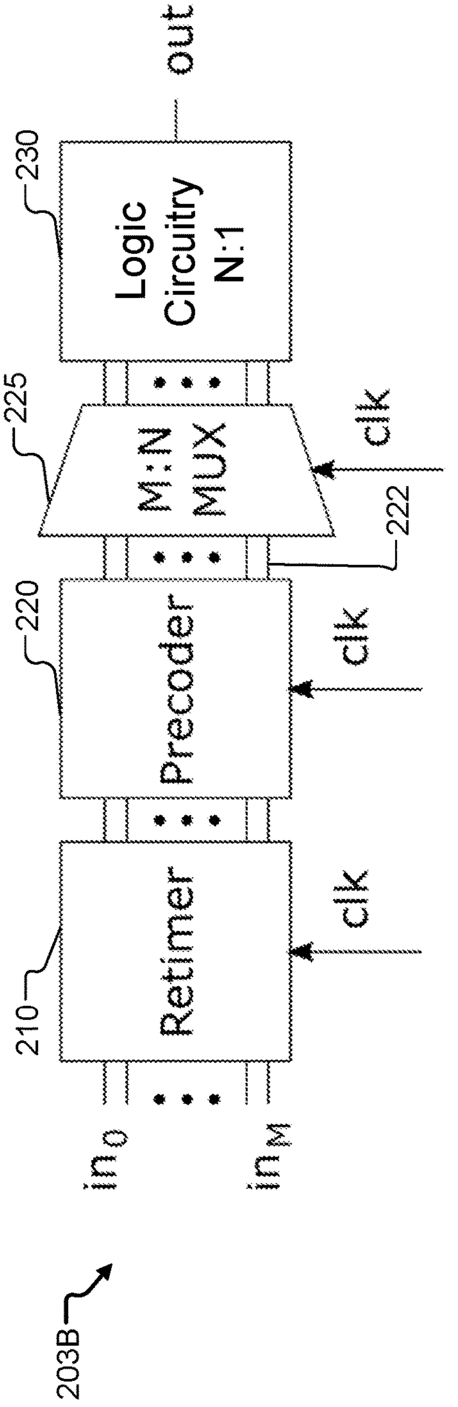
FIG. 2B is a schematic block diagram illustrating a combinational serializer according to at least another embodiment.

FIG. 2B is a schematic block diagram illustrating a combinational serializer 203B according to at least another embodiment. Building on the combinational serializer 203A of FIG. 2A, this combinational serializer 203B further includes a multiplexer 225 coupled between the precoder circuit 220 and the logic circuitry 230. In some embodiments, the multiplexer 225 is an M:N multiplexer (or multiple such multiplexers) that serializes the multiple precoded inputs 222 to N parallel lines. In this way, serialized, multiple precoded inputs 222 can be processed through the logic circuitry 230. In some embodiments, this insertion of the M:N multiplexer 225 enables the precoder circuit 220 to operate at a lowest available data rate (or at least a reduced data rate compared to a data rate of the serialized data output by the logic circuitry 230), followed by operating the multiplexer 225 at an intermediate data rate, and the logic function 230 replacing a multiplexer that would normally operate at a full data rate, but now is not clock-driven.

Figure 2C:
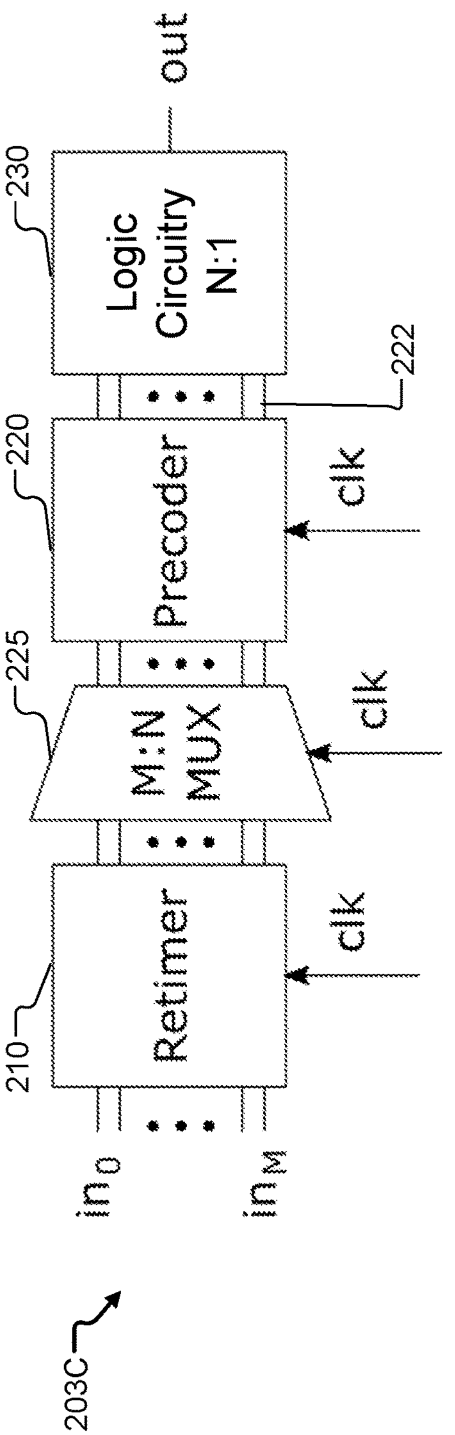
FIG. 2C is a schematic block diagram illustrating a combinational serializer according to at least another embodiment.

FIG. 2C is a schematic block diagram illustrating a combinational serializer 203C according to at least another embodiment. In this embodiment, the multiplexer 225 and the precoder circuit 220 switch positions in the serialization chain, such that the multiplexer 225 operates at a lowest available data rate (or at least a reduced data rate compared to a data rate of the serialized data output by the logic circuitry 230) and the pre-coder circuit 220 operates at an intermediate data rate.

In various embodiments, the precoding designed into the precoder circuit 220 depends on both the logic circuitry 230 (e.g., logic function implemented by the logic circuitry 230) as well as whether the precoding is preceded or followed by a multiplexer stage within the serialization chain. As such, many possible precoding functions are possible and envisioned. In one embodiment, a precoding function implemented by the precoder 220 is illustrated in Equation (1), e.g., and can be represent the logic function (e.g., module 2 summuation) implemented by the logic circuitry 230 as an XOR combination of the inputs.

$$a_i = in_i + \sum_{j=0}^{i-1} a_j + \sum_{k=i+1}^{m} a_k \cdot z^{-1} \tag{1}$$

An example of the resultant logic following Equation (1) for a 2:1 XOR combination is illustrated in Equation (2) and Equation (3).

$$a_0 = in_0 + a_1 \cdot z^{-1} \tag{2}$$

$$a_1 = in_1 + a_0 \tag{3}$$

Figure 3:
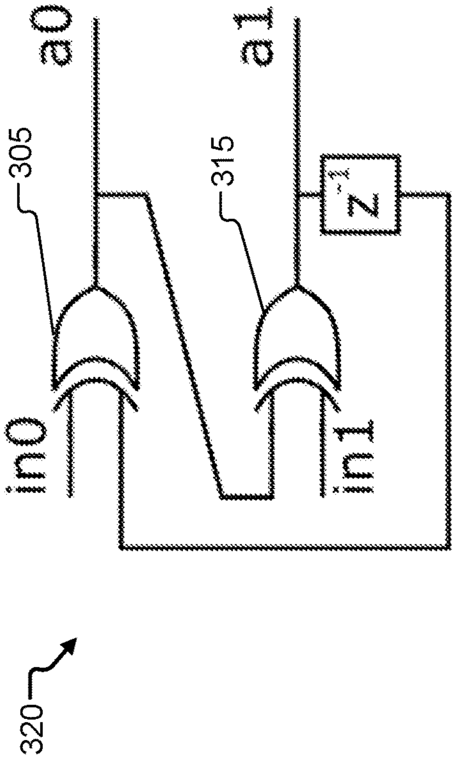
FIG. 3 is a schematic circuit diagram of an example precoder circuit for use with an exclusive OR (XOR) logic function according to at least some embodiments.

Further, the logic of Equations (2)-(3) may be implemented by the precoder circuit 220, as illustrated in an example precoder circuit 320 of FIG. 3. As illustrated in FIG. 3, the precoder circuit 320 may be implemented with two XOR gates, a first XOR gate 305 to output a0 and a second XOR gate 315 to output a1. In some embodiments, an output of each XOR gate is looped back into an input of the other XOR gate. Further, in these embodiments, the output of the second XOR gate 315 is delayed before being inserted as an input to the first XOR gate 305, where $z^{-1}$ refers to a one-sample delay operation in a discrete-time system.

Figure 4:
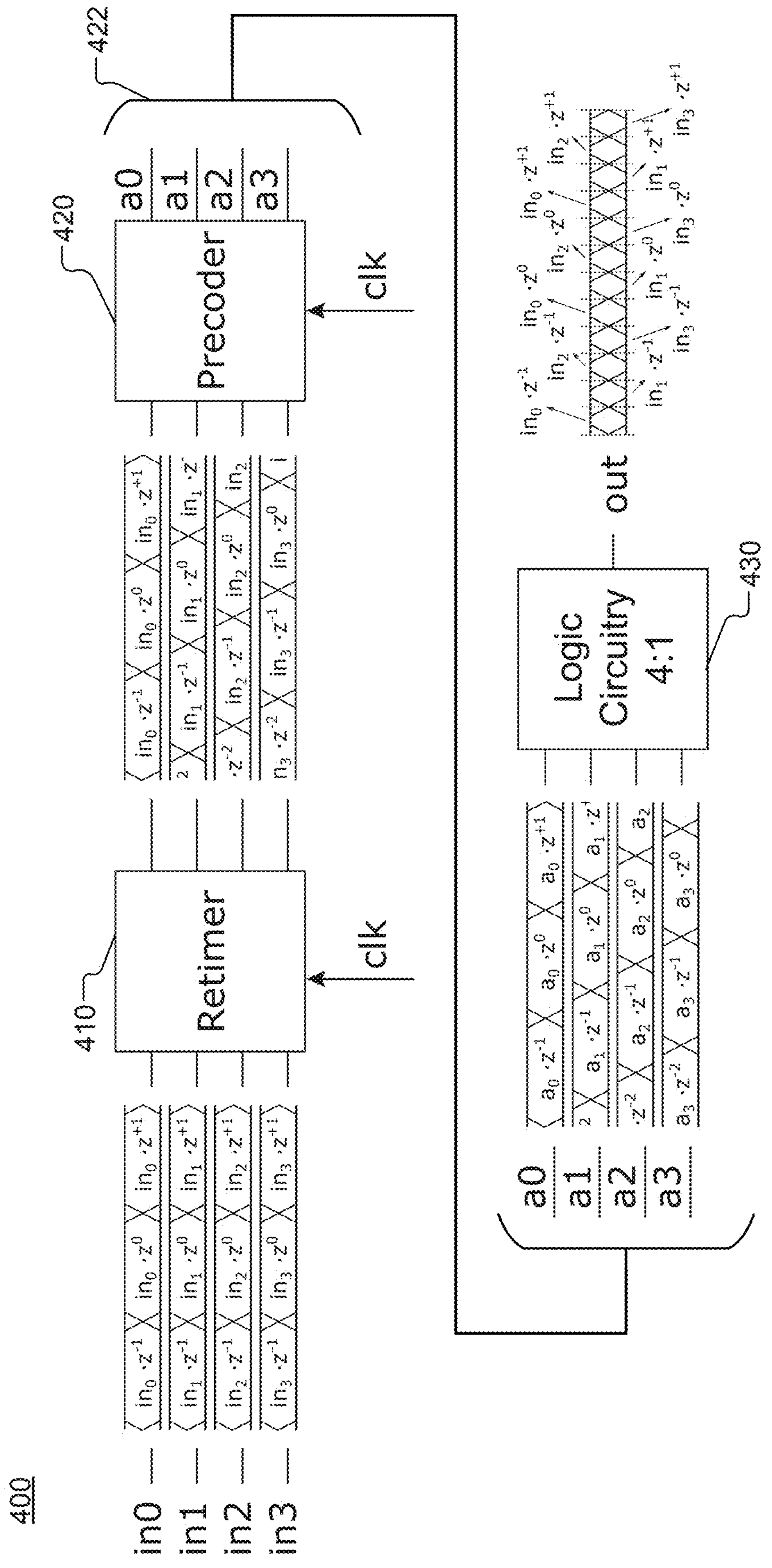
FIG. 4 is a schematic block diagram of an example combinational serializer having logic circuitry as a final four-to-one multiplexer stage according to at least some embodiments.

FIG. 4 is a schematic block diagram of an example combinational serializer 400 having logic circuitry as a final four-to-one multiplexer stage according to at least some embodiments. Accordingly, the combinational serializer 400 is a specific example of the combinational serializer 203A (FIG. 2A), including a retimer circuit 410 that receives four data inputs ($in_0$ . . . in3), a precoder circuit 420 coupled to the retimer circuit 410, and logic circuitry 430 coupled to the precoder circuit 420 and configured to perform a logic operation that, with proper precoding by the precoder circuit 420, performs a 4:1 multiplex operation to output serialized data (out).

In at least some embodiments, the retimer circuit 410 generates multiple retimed data inputs based on a clock signal (clk), where the outputs of the retimer circuit 410 have been shifted in time. In these embodiments, the precoder circuit 420 generates, from the multiple retimer data inputs, multiple precoded data inputs 422 based on timing of data symbols positioned within the multiple retimer data inputs. As is illustrated, for example, $in_0 \cdot z^{-1}$ is replaced with $a_0 \cdot z^{-1}$, $in_1 \cdot z^{-1}$ is replaced with $a_1 \cdot z^{-1}$, and so forth. In these embodiments, the logic circuitry 430 implements 4:1 serialization and is configured to output serialized data from the multiple precoded data inputs without use of the clock signal.

An example of the resultant logic following Equation (1) for a 4:1 XOR combination is illustrated in Equations (4)-(7), illustrating the multiple precoded data inputs 422, namely a0, a1, a2, and a3.

$$a_0 = in_0 + a_1 \cdot z^{-1} + a_2 \cdot z^{-1} + a_3 \cdot z^{-1} \quad (4)$$

$$a_1 = in_1 + a_0 + a_2 \cdot z^{-1} + a_3 \cdot z^{-1} \quad (5)$$

$$a_2 = in_2 + a_0 + a_1 + a_3 \cdot z^{-1} \quad (6)$$

$$a_3 = in_3 + a_0 + a_1 + a_2 \quad (7)$$

Figure 5:
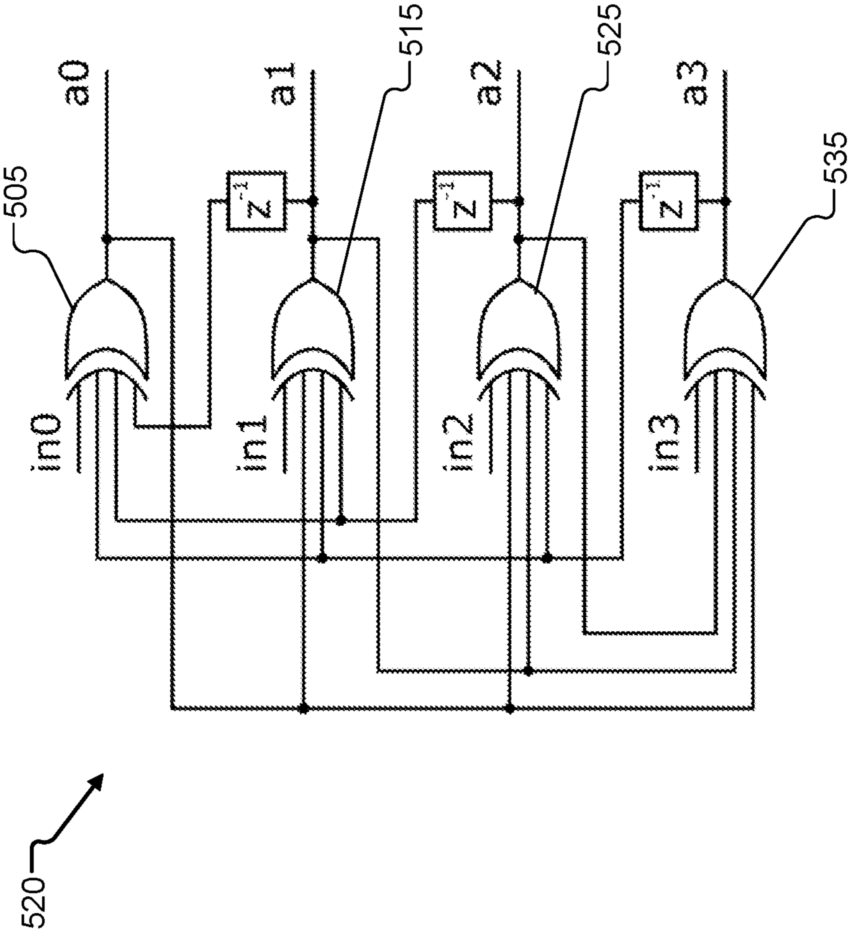
FIG. 5 is a circuit diagram of an example precoder circuit useable in the combinational serializer of FIG. 4 according to an embodiment.

The logic of Equations (4)-(7) may be implemented by the precoder circuit 220, as illustrated in an example precoder circuit 520 of FIG. 5. As illustrated in FIG. 5, the precoder circuit 520 may be implemented with four XOR gates, a first XOR gate 505 (to output a0), a second XOR gate 515 to output a1, a third XOR gate 525 to output a2, and a fourth XOR gate 535 to output a3. In some embodiments, an output of each XOR gate is looped back into an input of the other XOR gates. Further, in these embodiments, the output of the second XOR gate 515 is delayed (e.g., indicated by $z^{-1}$) before being inserted as an input to the first XOR gate 505, the output of the third XOR gate 525 is delayed before being inserted as an input to the first XOR gate 505 and the second XOR gate 515, and the output of the fourth XOR gate 535 is delayed before being inserted as an input into the first XOR gate 505, the second XOR gate 515, and the third XOR gate 525.

Figure 6:
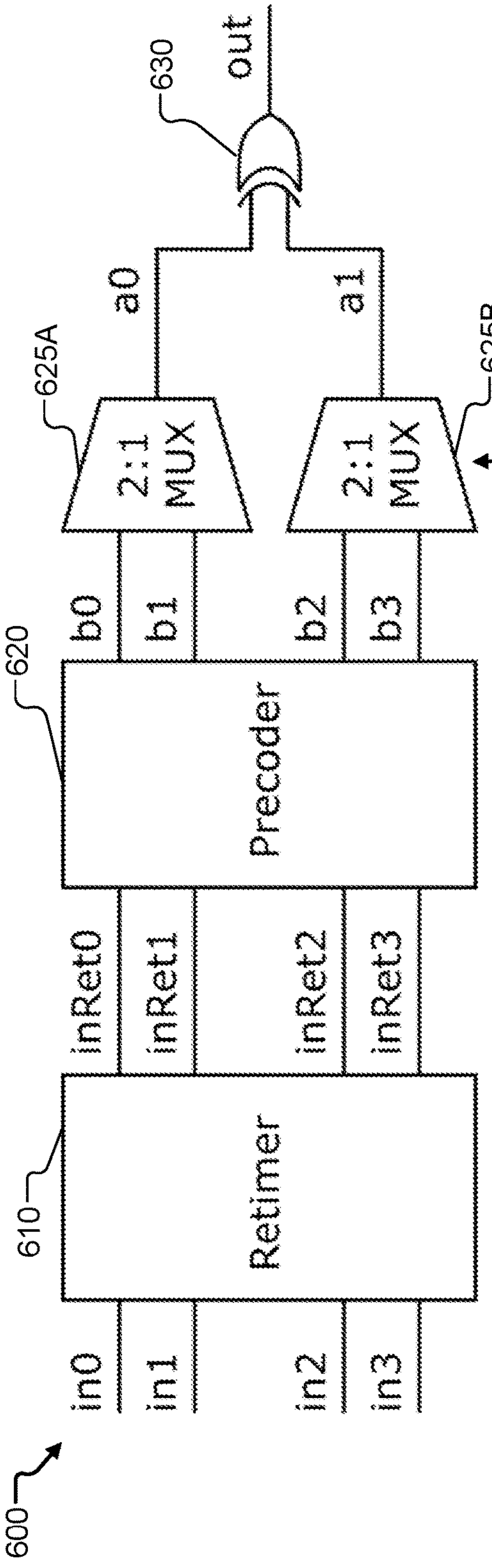
FIG. 6 is a schematic block diagram of an example combinational serializer having logic circuitry as a final four-to-one multiplexer stage according to other embodiments.

FIG. 6 is a schematic block diagram of an example combinational serializer 600 having logic circuitry as a final four-to-one multiplexer stage according to other embodiments. In some embodiments, the combinational serializer 600 is patterned after the combinational serializer 203B of FIG. 2B. For example, in these embodiments, the combinational serializer 600 includes a retimer 610 circuit coupled to a precoder circuit 620, a pair of 2:1 multiplexers 625 coupled to the precoder circuit 620 with a first multiplexer 625A and a second multiplexer 625B, and logic circuitry 630 coupled to the pair of 2:1 multiplexers 625. In these embodiments, the retimer circuit 610 generates multiple retimed data inputs (e.g., inRet0, inRet1, inRet2, inRet3). In embodiments, the precoder circuit 620 generates, from the multiple retimer data inputs, multiple precoded data inputs (b0-b3) based on timing of data symbols positioned within the multiple retimer data inputs.

In some embodiments, the pair of 2:1 multiplexers 625 serializes the multiple precoded inputs (b0-b3) to N parallel lines (a0 and a1). In this way, serialized, multiple precoded inputs (b0-b3) can be processed through the logic circuitry 630. In some embodiments, the use of the pair of 2:1 multiplexers 625 enables the precoder circuit 620 to operate at a lowest available data rate (or at least a reduced data rate compared to a data rate of the serialized data output by the logic circuitry 630), followed by operating the pair of 2:1 multiplexers 625 at an intermediate data rate, and the logic function 630 replacing a multiplexer that would normally operate at a full data rate. In the illustrated embodiment, the logic circuitry 630 is an XOR function.

Figure 7:
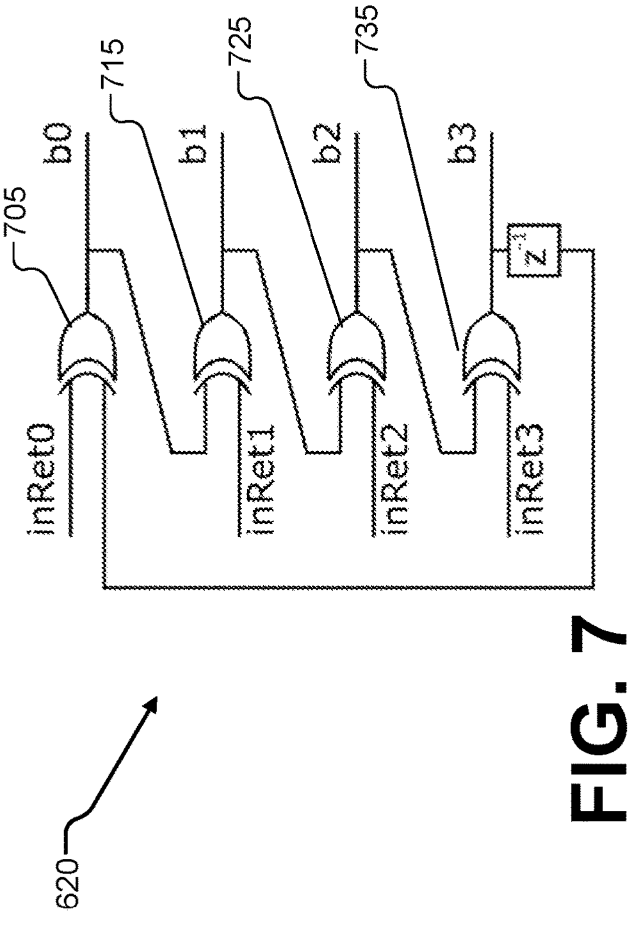
FIG. 7 is a circuit diagram of an example precoder circuit useable in the combinational serializer of FIG. 6 according to another embodiment.

In an illustrated embodiment of FIG. 7, the precoder circuit 620 includes four XOR gates, each including an input from each output of one or more different XOR gates of the four XOR gates. For example, each XOR gate can receive an adjacent output as an input in addition to one of the multiple retimer data inputs. For example, the inputs to these four XOR gates can include a corresponding retimer data input and a sequentially previous precoded data input (b0-b3), the last of which circles back to a first XOR gate.

More specifically, in some embodiments, the four XOR gates include a first XOR gate 705, a second XOR gate 715, a third XOR gate 725, and a fourth XOR gate 735, which respectively generate the multiple precoded data inputs (b0-b3). In these embodiments, the inputs to the first XOR gate 705 include the first retimed data input (inRet0) and a delayed (e.g., $z^{-1}$) fourth output (b3) of the fourth XOR gate 735. In some embodiments, the inputs to the second XOR gate 715 include the second retimed data input (inRet1) and the output (b0) of the first XOR gate 705. In embodiments, the inputs to the third XOR gate 725 include the third retimed data input (inRet2) and the output (b1) of the second XOR gate 715. Finally, in embodiments, the inputs to the fourth XOR gate 735 include the fourth retimed data input (inRet3) and the output (b2) of the third XOR gate 725. In other embodiments, when the logic circuitry 630 is an XNOR gate, the precoder circuit 620 is implemented using four XNOR gates, each that receives an adjacent output as an input in addition to one of the multiple retimer data inputs (inRet0 to inRet3).

Figure 8:
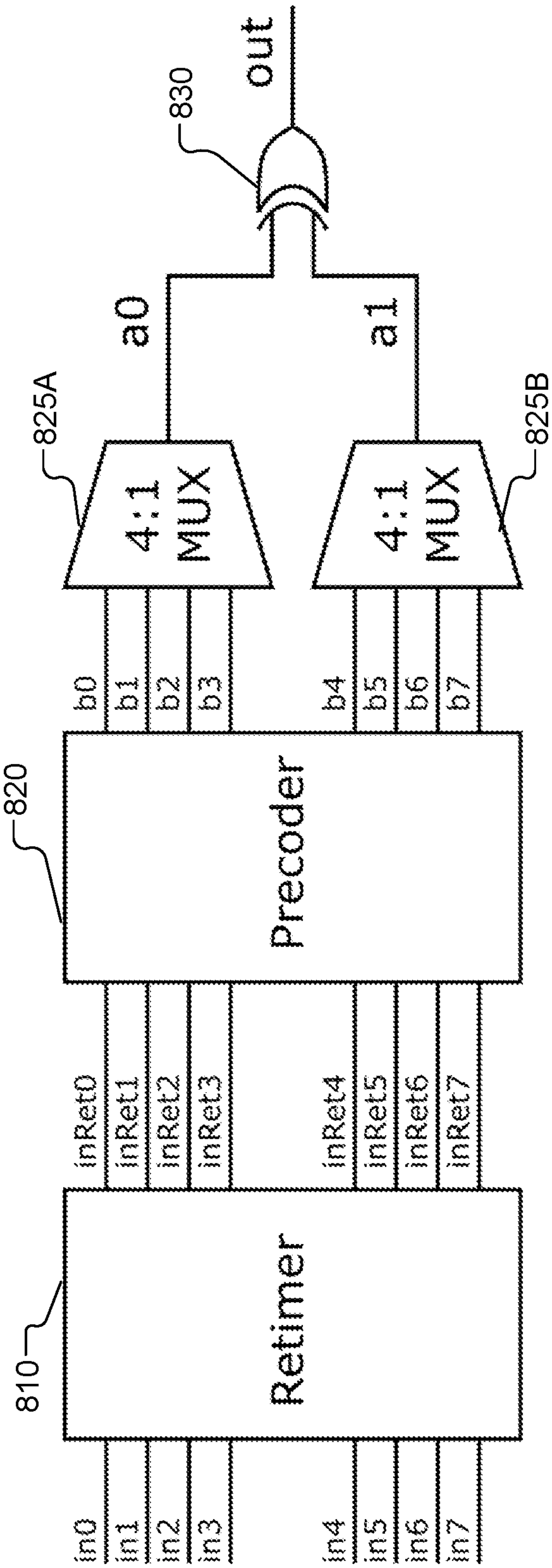
FIG. 8 is a schematic block diagram of an example combinational serializer having logic circuitry for eight-to-one multiplexing according to some embodiments.

FIG. 8 is a schematic block diagram of an example combinational serializer 800 having logic circuitry for eight-to-one multiplexing according to some embodiments. In some embodiments, the combinational serializer 800 is patterned after the combinational serializer 203B of FIG. 2B. For example, in these embodiments, the combinational serializer 800 includes a retimer 810 circuit coupled to a precoder circuit 820, a pair of 4:1 multiplexers 825 coupled to the precoder circuit 820, including a first multiplexer 825A and a second multiplexer 825B, and logic circuitry 830 coupled to the pair of 4:1 multiplexers 825. In these embodiments, the retimer circuit 810 generates multiple retimed data inputs (e.g., inRet0 to inRet7). In embodiments, the precoder circuit 820 generates, from the multiple retimer data inputs, multiple precoded data inputs (b0-b7) based on timing of data symbols positioned within the multiple retimer data inputs.

In some embodiments, the pair of 4:1 multiplexers 825 serializes the multiple precoded inputs (b0-b7) to N parallel lines (a0 and a1). In this way, serialized, multiple precoded inputs (b0-b7) can be processed through the logic circuitry 830. In some embodiments, the use of the pair of 4:1 multiplexers 825 enables the precoder circuit 820 to operate at a lowest available data rate (or at least a reduced data rate compared to a data rate of the serialized data output by the logic circuitry 830), followed by operating the pair of 4:1 multiplexers 825 at an intermediate data rate and the logic function 830 replacing a multiplexer that would normally operate at a full data rate. In the illustrated embodiment, the logic circuitry 830 is an XOR function.

Figure 9:
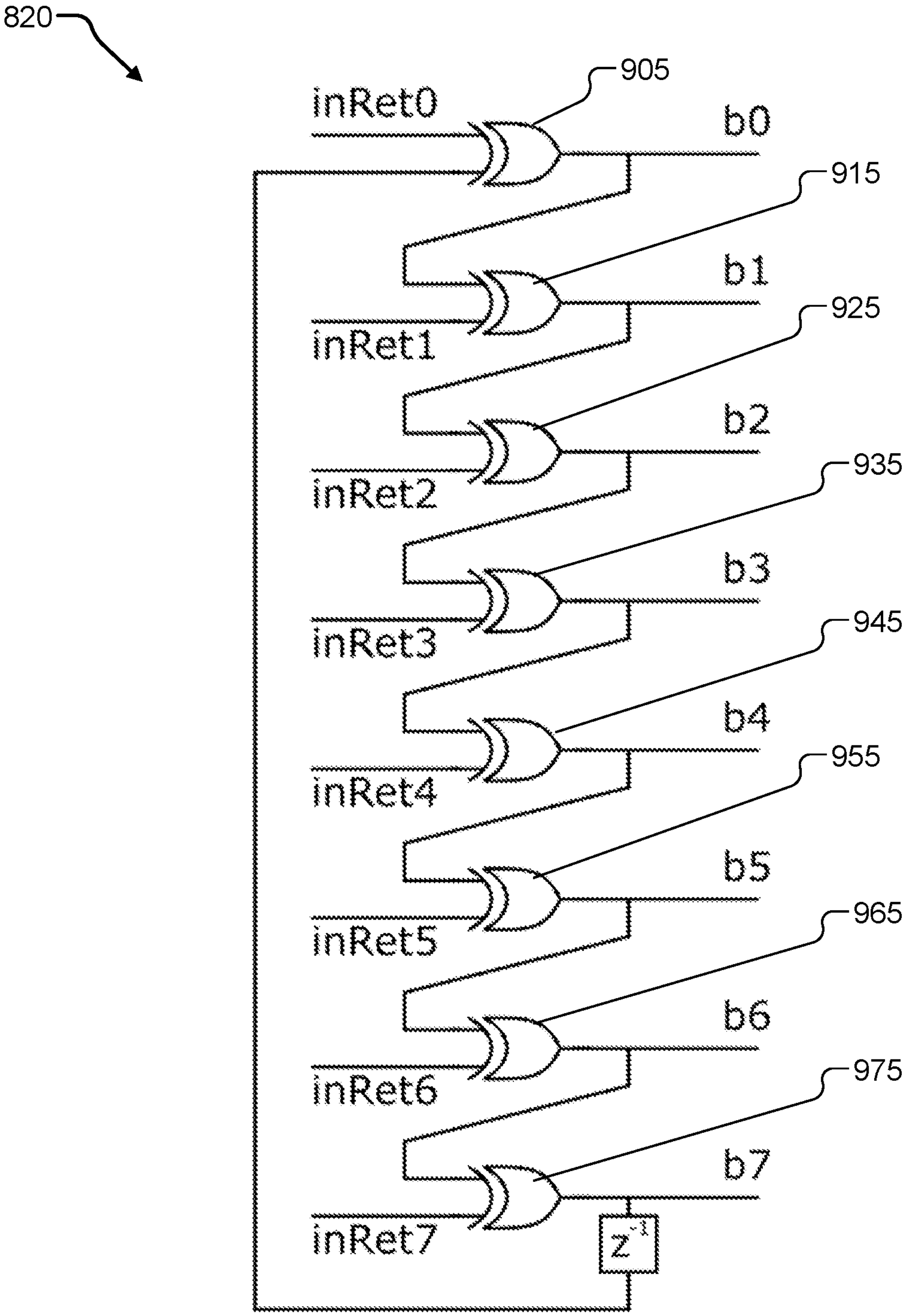
FIG. 9 is a circuit diagram of an example precoder circuit useable in the combinational serializer of FIG. 8 according to another embodiment.

In an illustrated embodiment of FIG. 9, the precoder circuit 820 includes eight XOR gates, each including an input from each output of one or more different XOR gates of the four XOR gates. For example, each XOR can receive an adjacent output as an input in addition to one of the multiple retimer data inputs. The inputs to these eight XOR gates include a corresponding retimer data input and a sequentially previous precoded data input (b0-b7), the last of which circles back to a first XOR gate.

More specifically, in some embodiments, the eight XOR gates include a first XOR gate 905, a second XOR gate 915, a third XOR gate 925, a fourth XOR gate 935, a fifth XOR gate 945, a sixth XOR gate 955, a seventh XOR gate 965, and an eighth XOR gate 975, which respectively generate the multiple precoded data inputs (b0-b7). In these embodiments, the inputs to the first XOR gate 905 include the first retimed data input (inRet0) and a delayed (e.g., $z^{-1}$) eighth output (b7) of the eighth XOR gate 975. In embodiments, the inputs to the second XOR gate 915 include the second retimed data input (inRet1) and the output (b0) of the first XOR gate 905. In embodiments, the inputs to the third XOR gate 925 include the third retimed data input (inRet2) and the output (b1) of the second XOR gate 915. In embodiments, the inputs to the fourth XOR gate 935 include the fourth retimed data input (inRet3) and the output (b2) of the third XOR gate 925. In embodiments, the inputs to the fifth XOR gate 945 include the fifth retimed data input (inRet4) and the output (b3) of the fourth XOR gate 935. In embodiments, the inputs to the sixth XOR gate 955 include the sixth retimed data input (inRet5) and the output (b4) of the fourth XOR gate 945. In embodiments, the inputs to the seventh XOR gate 965 include the seventh retimed data input (inRet6) and the output (b5) of the fifth XOR gate 955. In embodiments, the inputs to the eighth XOR gate 975 include the eighth retimed data input (inRet7) and the output (b6) of the seventh XOR gate 965. In other embodiments, when the logic circuitry 830 is an XNOR gate, the precoder circuit 820 is implemented using eight XNOR gates, each that receives an adjacent output as an input in addition to one of the multiple retimer data inputs (inRet0 to inRet7).

Figure 10:
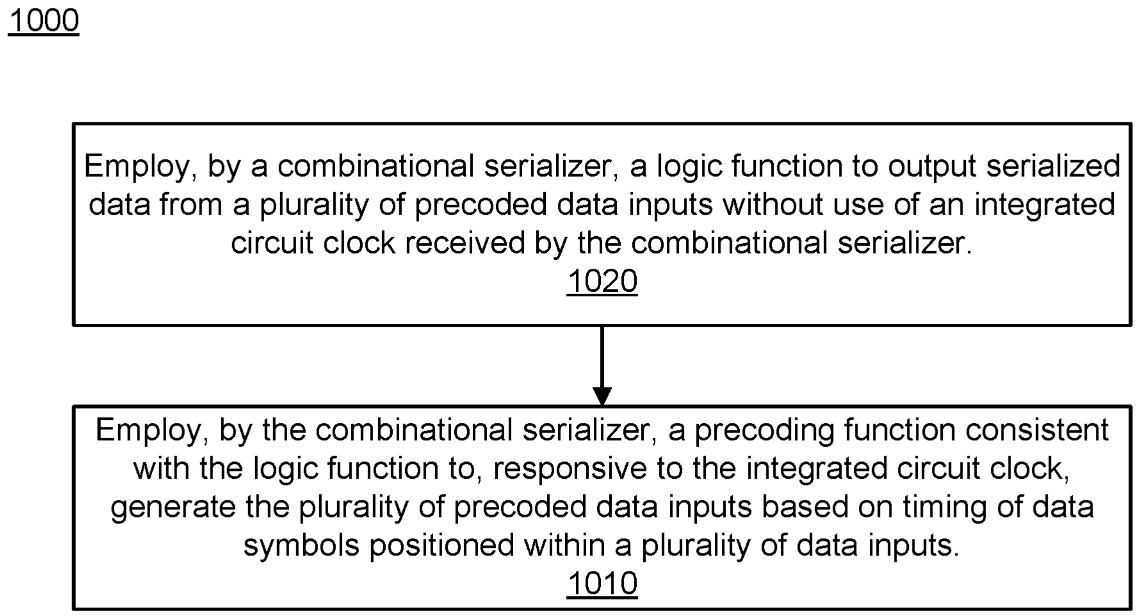
FIG. 10 is a flow chart of an example method for employing a combinational serializer to obviate full-rate clock distribution according to some embodiments.

FIG. 10 is a flow chart of an example method 1000 for employing a combinational serializer to obviate full-rate clock distribution according to some embodiments. The method 1000 can be performed by processing logic comprising hardware, software, firmware, or any combination thereof. For example, the method 1000 can be performed by the combinational serializer 103 or the data serializer system 100 that includes the combinational serializer 103 (see FIG. 1). In other embodiments, the method 1000 is performed using any other combinational serializer disclosed herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1010, the processing logic employs a logic function to output serialized data from multiple precoded data inputs without use of an integrated circuit clock received by the combinational serializer.

At operation 1020, the processing logic employs a precoding function consistent with the logic function to, responsive to the integrated circuit clock, generate multiple precoded data inputs based on timing of data symbols positioned within multiple data inputs.

In some embodiments of the method 1000, the precoding function causes timing of transitional changes in the data symbols within the multiple data inputs to also appear in the multiple precoded data inputs in a way that enables the logic function to generate the serialized data that would have been generated by a clock-driven multiplexer.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that the distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from a providing entity to an acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. An integrated circuit comprising:

logic circuitry configured to output serialized data from a plurality of precoded data inputs without use of a clock signal;

a precoder circuit responsive to the clock signal to generate the plurality of precoded data inputs based on timing of data symbols positioned within a plurality of data inputs; and one or more multiplexers positioned between a retimer circuit and the precoder circuit, wherein multiplexing by the one or more multiplexers is at least one of:

a lowest available data rate of a plurality of retimed data inputs; or a reduced data rate compared to a data rate of the serialized data.

2. The integrated circuit of claim 1, wherein the precoder circuit is to cause timing of transitional changes in the data symbols within the plurality of data inputs to also appear in the plurality of precoded data inputs in a way that enables the logic circuitry to generate the serialized data that would have been expected from operations of a clock-driven M:1 multiplexer, where M is a number of the plurality of data inputs.

3. The integrated circuit of claim 1, further comprising the retimer circuit coupled between an input and the precoder circuit, the retimer circuit to generate the plurality of data inputs that are retimed based on the clock signal.

4. The integrated circuit of claim 1, wherein the precoder circuit comprises summing logic implemented with a modulo 2 function.

5. The integrated circuit of claim 1, wherein the logic circuitry comprises an exclusive OR (XOR) gate with a number of inputs matching a number of the plurality of precoded data inputs.

6. The integrated circuit of claim 4, wherein the precoder circuit comprises a plurality of XOR gates, each including an input from each output of one or more different XOR gates of the plurality of XOR gates.

7. The integrated circuit of claim 1, wherein the logic circuitry comprises a not exclusive OR (XNOR) gate with a number of inputs matching a number of the plurality of precoded data inputs.

8. The integrated circuit of claim 4, wherein the precoder circuit comprises a plurality of XNOR gates, each including an input from each output of one or more different XNOR gates of the plurality of XNOR gates.

9. A device comprising:

a retimer circuit to generate a plurality of retimed data inputs based on a clock signal;

a precoder circuit to generate, from the plurality of retimer data inputs, a plurality of precoded data inputs based on timing of data symbols positioned within the plurality of retimer data inputs; and logic circuitry configured to output serialized data from the plurality of precoded data inputs without use of the clock signal; and one or more multiplexers positioned between the retimer circuit and the precoder circuit, wherein multiplexing by the one or more multiplexers is at least one of:

a lowest available data rate of the plurality of retimed data inputs; or a reduced data rate compared to a data rate of the serialized data.

10. The device of claim 9, wherein the precoder circuit is to cause timing of transitional changes in the data symbols within the plurality of retimed data inputs to also appear in the plurality of precoded data inputs in a way that enables the logic circuitry to generate the serialized data.

11. The device of claim 9, wherein the precoder circuit comprises summing logic implemented with a modulo 2 function.

12. The device of claim 9, further comprising at least a pair of multiplexers coupled between an output of the precoder circuit and the logic circuitry, wherein the logic circuitry receives outputs of the pair of multiplexers in generating the serialized data.

13. The device of claim 12, wherein the pair of multiplexers are 2:1 multiplexers;

the logic circuitry is an XOR gate; and the precoder circuit comprises four XOR gates, each that receives an adjacent output as an input in addition to one of the plurality of retimer data inputs.

14. The device of claim 12, wherein the pair of multiplexers are 4:1 multiplexers;

the logic circuitry is an XOR gate; and the precoder circuit comprises eight XOR gates, each that receives an adjacent output as an input in addition to one of the plurality of retimer data inputs.

15. The device of claim 12, wherein the pair of multiplexers are 2:1 multiplexers;

the logic circuitry is an XNOR gate; and the precoder circuit comprises four XNOR gates, each that receives an adjacent output as an input in addition to one of the plurality of retimer data inputs.

16. The device of claim 12, wherein the pair of multiplexers are 4:1 multiplexers;

the logic circuitry is an XNOR gate; and the precoder circuit comprises eight XNOR gates, each that receives an adjacent output as an input in addition to one of the plurality of retimer data inputs.

17. A method comprising:

employing, by a combinational serializer, a logic function to output serialized data from a plurality of precoded data inputs without use of an integrated circuit clock received by the combinational serializer;

employing, by the combinational serializer, a precoding function consistent with the logic function to, responsive to the integrated circuit clock, generate the plurality of precoded data inputs based on timing of data symbols positioned within a plurality of data inputs; and multiplexing, by one or more multiplexers positioned between a retimer circuit and the combinational serializer, at least one of:

a lowest available data rate of a plurality of retimed data inputs; or a reduced data rate compared to a data rate of the serialized data.

18. The method of claim 17, wherein the precoding function is to cause timing of transitional changes in the data symbols within the plurality of data inputs to also appear in the plurality of precoded data inputs in a way that enables the logic function to generate the serialized data that would have been generated by a clock-driven multiplexer.

19. The method of claim 17, further comprising, generating, by the retimer circuit coupled between an input and the combinational serializer, the plurality of data inputs that are retimed based on the integrated circuit clock.

* * * * *